(12) United States Patent
Hosokawa

(10) Patent No.: US 6,212,267 B1
(45) Date of Patent: Apr. 3, 2001

(54) SWITCHING SYSTEM SERVICE CONTROLLER OPERATING IN A CLOSED LOOP WITH CALL PROCESSOR USING SUBSCRIBER-SPECIFIC SCHEDULING MEMORIES

(75) Inventor: Mitsuhiro Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/249,097

(22) Filed: Feb. 12, 1999

(30) Foreign Application Priority Data

Feb. 16, 1998 (JP) .................................................. 10-050119

(51) Int. Cl.$^7$ ...................................................... H04M 3/42
(52) U.S. Cl. ........................ 379/201; 379/88.22; 379/269
(58) Field of Search ................................ 379/88.22, 196, 379/201, 208, 211, 269

(56) References Cited

U.S. PATENT DOCUMENTS

| | | | |
|---|---|---|---|
| 4,878,240 | * 10/1989 | Lin et al. ............................. | 379/201 |
| 5,541,986 | * 7/1996 | Hou ..................................... | 379/201 |
| 6,005,866 | * 12/1999 | Lincoln ............................... | 370/398 |

FOREIGN PATENT DOCUMENTS 4-97645  3/1992  (JP) .

* cited by examiner

Primary Examiner—Ahmad Matar
Assistant Examiner—Bing Bui
(74) Attorney, Agent, or Firm—Sughrue, Mion, Zinn, Macpeak & Seas, PLLC

(57) ABSTRACT

A switching system for a communications network has a service module memory for storing service modules each containing programmed instructions for a service feature and service scheduling memories respectively associated with subscribers. Each scheduling memory has a number of tables respectively associated with different events which may occur during the process of a call by a call processor. Each table has entries for storing service features of different priorities, each entry giving an indication of presence or absence of a follows entry for a service feature of lower priority to be executed next depending on a result of execution of instructions by the call processor. When control circuitry detects an event when the call processor is processing a call from a subscriber, it retrieves a table from the service scheduling memory of the subscriber that is associated with the event, retrieves a module from the service module memory corresponding to a first entry of the table, and requests the call processor to execute instructions of the module. From the service module memory, the control circuitry retrieves a second module corresponding to a second entry of the table if a presence indication of the second entry is given in the first entry depending on a result of the execution of the instructions of the first module.

5 Claims, 3 Drawing Sheets

SWITCHING SYSTEM SERVICE CONTROLLER OPERATING IN A CLOSED LOOP WITH CALL PROCESSOR USING SUBSCRIBER-SPECIFIC SCHEDULING MEMORIES

BACKGROUND OF THE INVENTION

1. Field of the Invention

The present invention relates generally to switching systems for communications networks, and more specifically to a switching system for local telephone exchanges that directly serve subscribers and provide special service features.

2. Description of the Related Art

Japanese Laid-Open Patent Specification Hei-4-97645 discloses a service control point (SCP) of a signaling network for common channel interoffice signaling. The service control point has an interface to a communications network with which the signaling network is associated. It receives a service request via the interface from a switching system of the communications network and supplies the request to an application controller, which accesses a service specification table to read a service component for the requested service. Instructions will then be sent from the service control point to the originating switching system to set up the requested service through the communications network.

Japanese Laid-Open Patent Specification Hei-7-250164 discloses a switching system for a communications network. In the prior art system (FIG. 1), a call processor 10 receives call requests either from line interface 12 or trunk interface 13 to establish a connection through a switching network 11 between two subscribers or between a subscriber and an inter-office trunk. During the process of a call from a subscriber, an event analyzer 14 analyzes the status of the call to detect an event (e.g., hook flashes) for triggering a corresponding service feature. In response to the detection of an event, a service controller 15 makes a search through a service registration memory 16 for all service features that can be combined and provided to the subscriber as a composite service with respect to that event to receive programmed instructions of the composite service. Service controller 15 then accesses an event-specific priority memory 17 to determine the priorities of the individual service features of the composite service. Service-specific scheduling memories 18 are provided to indicate for each service feature a following service feature to be executed next. Service controller 15 references the scheduling memories according to the determined priorities and makes a decision on whether to proceed to provide the following service feature. Programmed instructions of the service features which are determined to be provided to the subscriber are supplied from the service controller to the call processor.

However, the service controller is required to make decisions by taking into account all possibilities chat can be encountered before it command the call processor to execute programmed instructions. Therefore, the prior art adds to system complexity, which results in difficulty for engineering design and maintenance.

SUMMARY OF THE INVENTION

It is therefore an object of the present invention to provide a switching system for a communications network which is efficient to provide a composite service to subscribers.

Another object of the present invention is to provide a switching system for a communications network which is simplified for engineering design and maintenance.

According to one aspect of the present invention, there is provided a switching system comprising a switching network, a call processor for processing a call, executing instructions associated with the call and controlling the switching network to establish a connection depending on the executed instructions, a service module memory for storing a plurality of modules each containing programmed instructions for each service feature, and a plurality of service scheduling memories respectively associated with subscribers, each of the scheduling memories including a plurality of tables respectively associated with different events which may occur during the process of a call by the call processor, each of the tables comprising a plurality of entries for storing service features of different priorities, each of the entries giving an indication of presence or absence of a following entry for a service feature of lower priority to be executed next depending on a result of requested execution of instructions by the call processor. Control circuitry is provided for detecting one of events when the call processor is processing a call from a subscriber, retrieving a table from the service scheduling memory of the subscriber according to the detected event, retrieving a first module from the service module memory corresponding to a first entry of the table, requesting the call processor to execute instructions of the first module and retrieving, from the service module memory, a second module corresponding to a second entry of the table if a presence indication of the second entry is given in the first entry depending on a result of the requested execution of the instructions of the first module.

According to another aspect of the present invention, three is provided a method of operating a switching system which comprises a switching network, a call processor for processing a call, executing instructions associated with the call and controlling the switching network to establish a connection depending on the executed instructions, a service module memory for storing a plurality of modules each containing programmed instructions for each service feature, and a plurality of service scheduling memories respectively associated with subscribers, each of the scheduling memories including a plurality of tables respectively associated with different events which may occur during the process of a call by the call processor, each of the tables comprising a plurality of entries for storing service features of different priorities, each of the entries giving an indication of presence or absence of a following entry for a service feature of lower priority to be executed next depending on a result of requested execution of instructions by the call processor, the entries of the table being arranged according to the priorities and accessible by an entry pointer. The method comprises the steps of (a) detecting one of events when the call processor is processing a call from a subscriber, (b) retrieving a table from the service scheduling memory of the subscriber according to the detected event, (c) accessing an entry of the table according to the entry pointer and retrieving a module from the service module memory associated with the service feature of the accessed entry, (d) requesting the call processor to execute instructions of the module, and (e) incrementing the entry pointer by one and repeating the steps (c) and (d) if a presence indication of a following entry is given in the entry accessed by the step (c) depending on a result of the execution requested by the step (d).

BRIEF DESCRIPTION OF THE DRAWINGS

The present invention will be described in further detail with reference to the accompanying drawings, in which.

DETAILED DESCRIPTION

Figure 1:
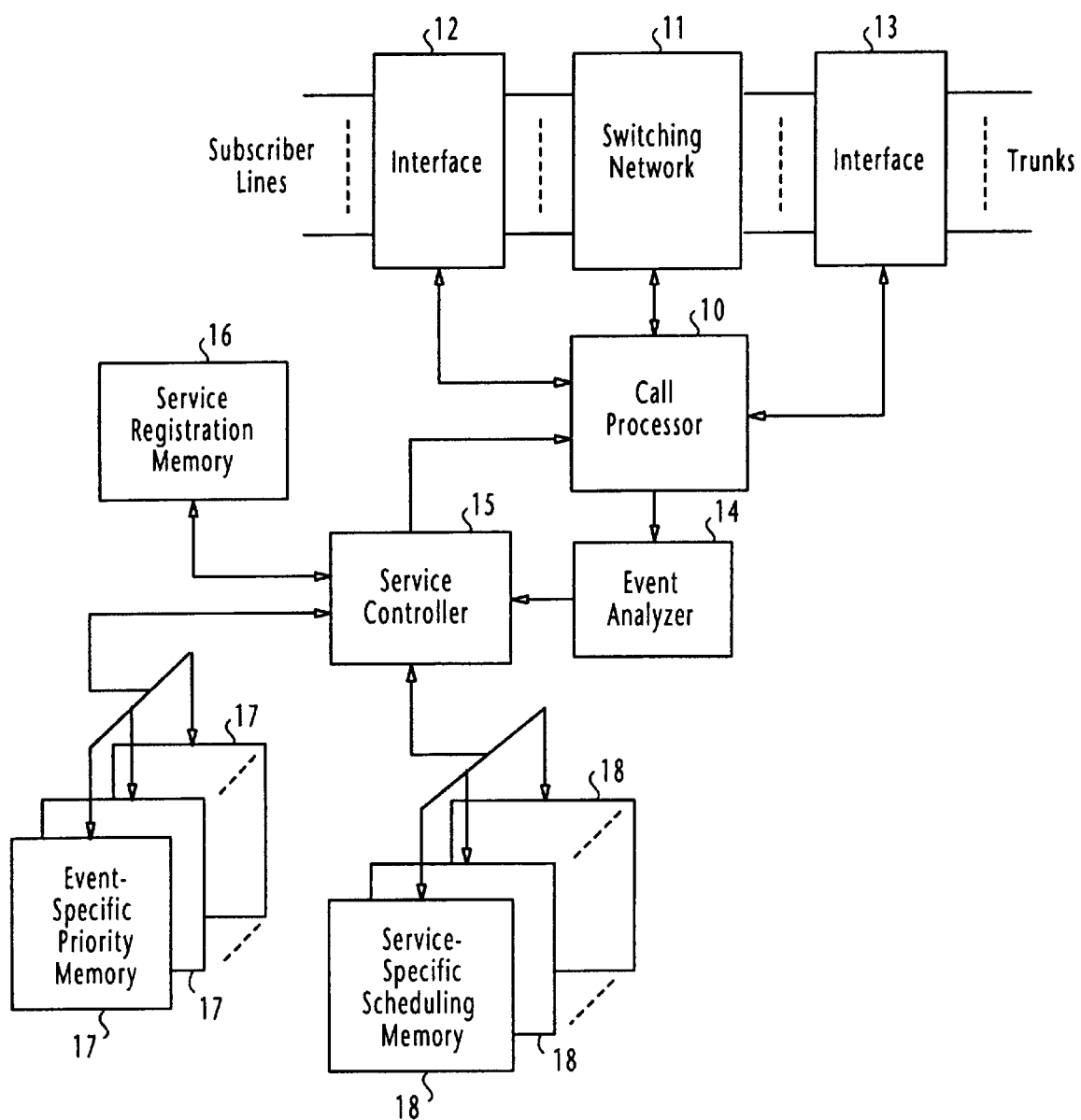
FIG. 1 is a block diagram of a prior art switching system for communications networks.
Figure 2:
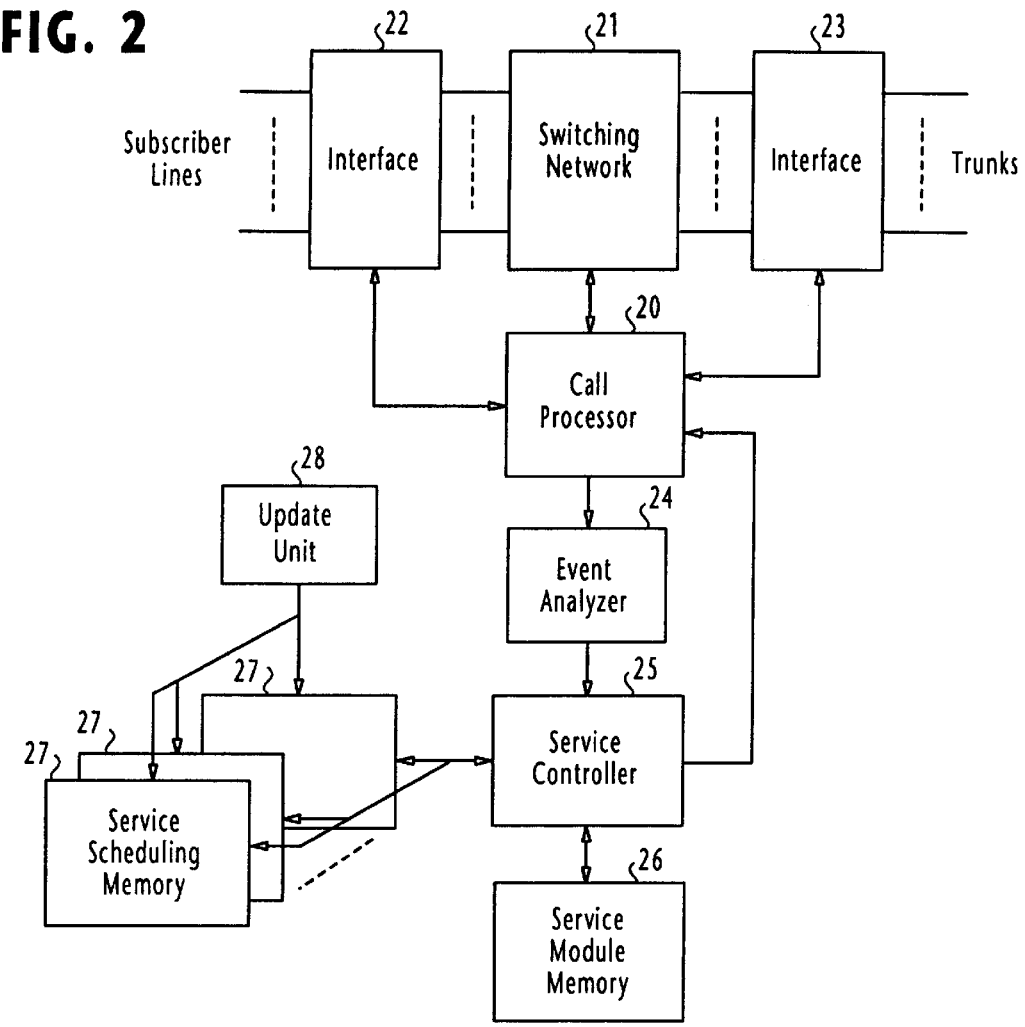
FIG. 2 is a block diagram of a switching system for communications networks according to the present invention.

In FIG. 2, there is shown a switching system for a communications network according to the present invention. The switching system of this invention comprises a call processor 20, which receives a request for a call from a line interface 22 or a trunk interface 23 to process the call and controls the switching network 21 to establish a connection.

An event analyzer 24 is connected to the call processor 20 to analyze the process of a call and identify an event having a particular significance to a special service provided to subscribers. The event so identified is reported to a service controller 25, to which a service module memory 26 and a plurality of service scheduling memories 27 are connected. Service module memory 26 holds a plurality of service modules for special service features. Each service module is identified by a service identifier and contains a sequence of programmed instructions which the call processor 20 performs when requested from the service controller 25.

Figure 3:
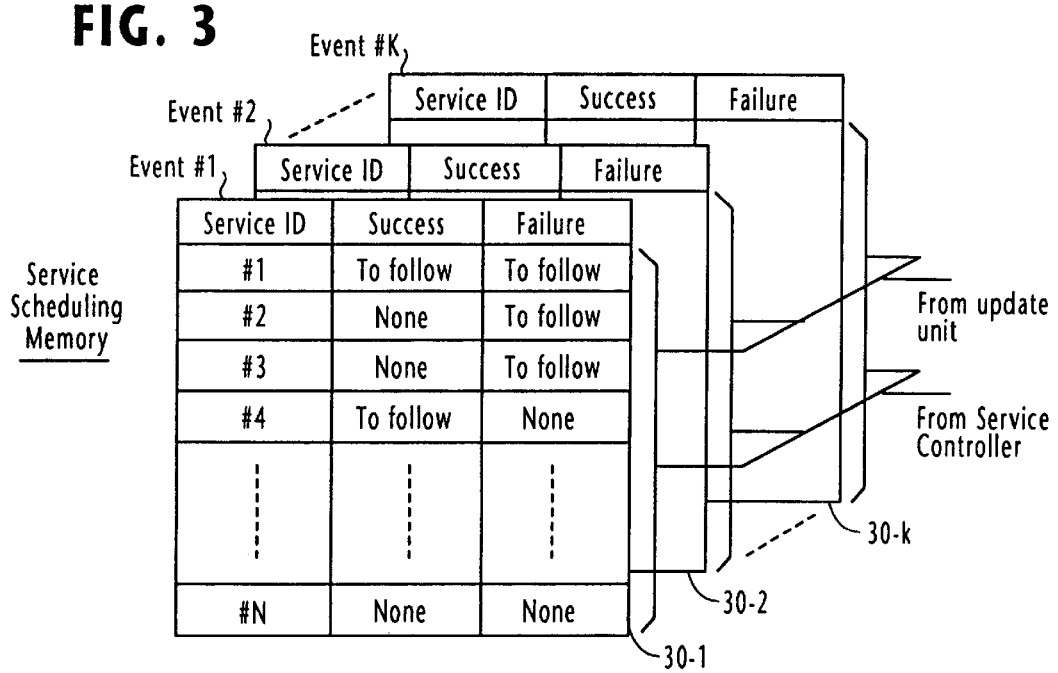
FIG. 3 is an illustration of each service scheduling memory of FIG. 1, showing details of the service features of a subscriber.

Service scheduling memories 27 are provided in a one-to-one or one-to-group correspondence to the subscribers to store the special service features of the individual subscribers or subscriber groups, As shown in more detail in FIG. 3, each of the service scheduling memories 27 defines, for each subscriber, a set of tables 30-1 to 30-k which are respectively associated with events #1 to #k which may occur during the process of a call of the subscriber. Each of the tables 30 has a plurality of service entries which are arranged from top to bottom in the order of descending priorities. In the illustrated example, service #1 has the highest priority and service #N has the lowest priority. Each service entry is specified by an entry pointer, which is incremented by one immediately after it is initialized to zero or when the service controller 25 has performed a process on that entry in order to access the next service entry. Each service entry is divided into "service ID", "success" and "failure" fields. The service ID field contains an identifier of a service feature and each of the success and failure fields contains an indication of whether there is a subsequent service feature to follow or there is none to follow. The contents of the service scheduling memories 27 are altered by in update unit 28.

Figure 4:
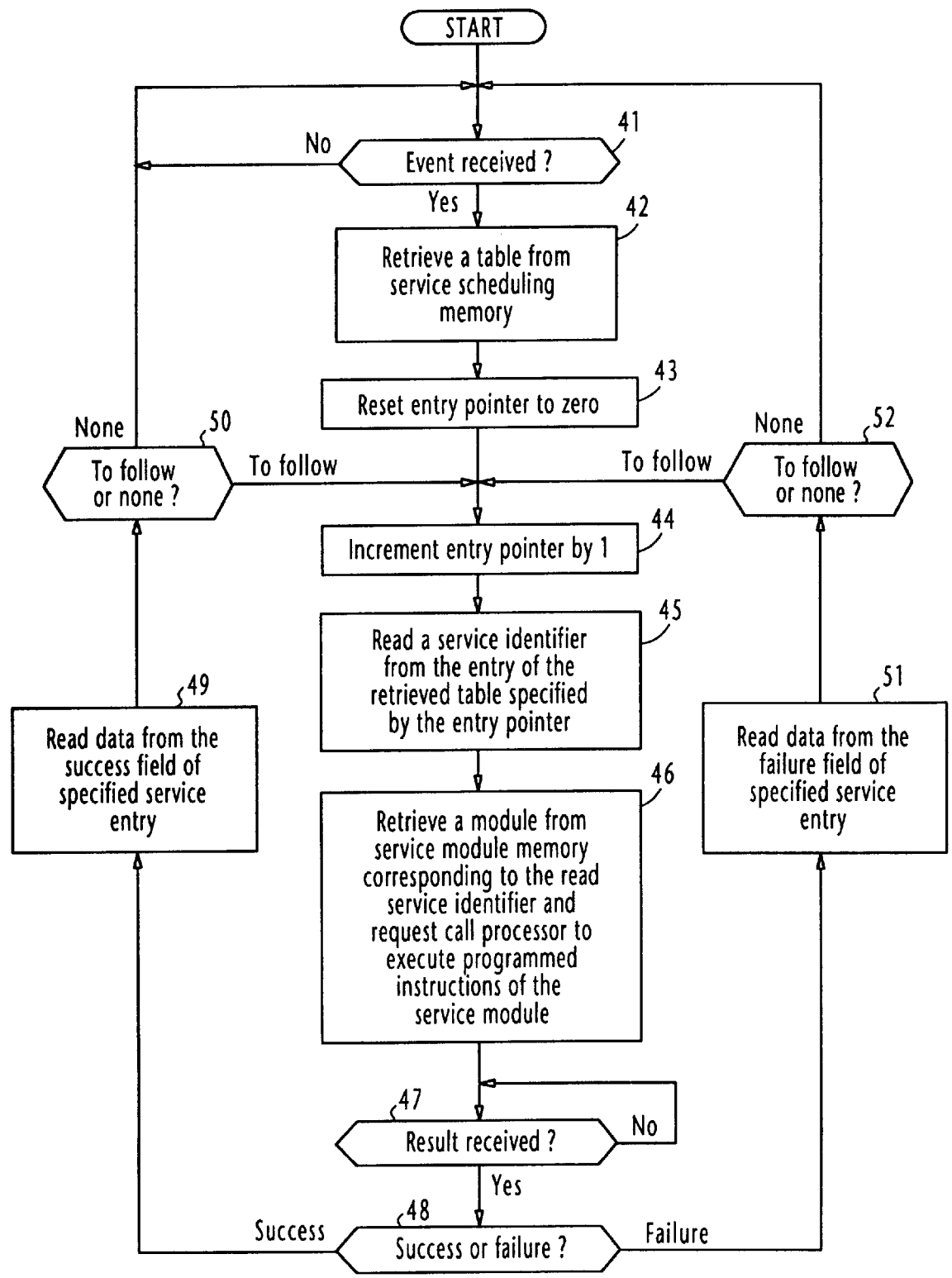
FIG. 4 is a flowchart of the operation of the service controller of FIG. 1.

In response to a call request from a subscriber, the service controller 25 operates according to the flowchart shown in FIG. 4. The operation of the service controller begins with decision step 41 in which the controller checks to see if an event is received from the event analyzer 24. If there is one, flow proceeds from step 41 to step 42 to retrieve one of the tables 30 from the service scheduling memory 27 of the requesting subscriber which corresponds to the reported event. At step 43, the controller 25 initializes the entry pointer to zero and proceeds to step 44 to increment the entry pointer by one.

Service controller 25 reads a service identifier from the entry of the retrieved table that is specified by the entry pointer (step 45). At step 46, the service controller retrieves a module from the service module memory 26 corresponding to the read service identifier and requests the call processor 20 to execute the programmed instructions of the read service module, and waits for a result of the execution which will be supplied from the event analyzer 24.

When a result of the execution is reported from the event analyzer 24 (step 47), the service controller 25 determines, at step 48, whether the result is a "success" indication that the requested service is successfully set up or a "failure" indication that the attempt has failed to meet the request.

If the reported result is a success indication, the service controller 25 proceeds from step 48 to step 49 to read information from the success field of the service entry currently specified by the entry pointer and examine the content of the information (step 50). If the information indicates that there is a service feature to follow, flow returns from step 50 to step 44 to repeat steps 45 to 48 on the next service entry of the retrieved table. If the information indicates that there is none to follow, the service controller 25 terminates the routine and returns to step 41.

If the current service feature is call forwarding to a specified destination, the execution of the service feature results in a success indication from the call processor 20 in response to an answer from the specified destination or a failure indication from the call processor upon failure to receive a response within a specified time-out period.

If the result examined at step 48 gives a failure indication, the service controller 25 proceeds from step 48 to step 51 to read information from the failure field of the service entry currently specified by the entry pointer and examine the content of the information (step 52). If the information indicates that there is a service feature to follow, flow returns from step 52 to step 44 to repeat steps 45 to 48 on the next service entry of the retrieved table. Otherwise, the service controller 25 terminates the routine and returns from step 52 to step 41.

Assume that, at step 45, table 30-1 is retrieved and service #1 is first selected. If the execution of the module of service #1 at step 46 is results in a successful setting up of service #1, giving a success indication (step 48), the subsequent reading of information from the success field of the entry of service #1 at step 49 results in a "to follow" indication at step 50 (see FIG. 3). Therefore, the controller 25 returns to step 44 to continue its operation by reading service identifier #2. If the execution of the module of service #2 results in a failure indication, the reading of information from the failure field of the entry of service #2 results in a "to follow" indication and control returns from step 51 to step 44 to read service identifier #3. If the execution of the module of service #3 results in a failure indication again, the reading of information from the failure field of the entry of service #3 results in a "to follow" indication and control returns from step 51 to step 44 to read service identifier #4. If the execution of the module of service #4 results in a success indication, then the reading of information from the success field of the entry of service #4 results in a "none" indication and control returns from step 51 to step 41 to terminate the routine.

It will be seen that, for any event that occurs during the process of a call, a plurality of service modules can be provided in a desired combination and in a desired order. Since the service controller 25 operates in a closed loop and it terminates its operation whenever there is no service feature to follow, system complexity is reduced and system engineering is simplified.

Another advantage of the present invention is that when die switching system is required to offer new service features or adapt to specific needs of each subscriber, the update unit 28 allows maintenance personnel to alter the contents of service scheduling memories 27 with ease.

What is claimed is:

1. A switching system comprising:

a switching network;

a call processor for processing a call, executing instructions associated with the call and controlling the switching network to establish a connection depending on the executed instructions;

a service module memory for storing a plurality of modules each containing programmed instructions for each service feature;

a plurality of service scheduling memories respectively associated with subscribers or groups of subscribers, each of the scheduling memories including a plurality of tables respectively associated with different events which may occur during the process of a call by said call processor, each of said tables comprising a plurality of entries for storing service features of different priorities, each of said entries giving an indication of presence or absence of a following entry for a service feature of lower priority to be executed next depending on a result of requested execution of instructions by said call processor; and control circuitry for detecting one of events when the call processor is processing a call from a subscriber, retrieving a table from the service scheduling memory of the subscriber according to the detected event, retrieving a first module from said service module memory corresponding to a first entry of the table, requesting the call processor to execute instructions of the first module and retrieving, from said service module memory, a second module corresponding to a second entry of said table if a presence indication of the second entry is given in said first entry depending on a result of the requested execution of the instructions of the first module.

2. The switching system of claim 1, further comprising an up date means for altering contents of said service scheduling memories.

3. The switching system of claim 1, wherein each entry of the retrieved table includes first and second fields each containing an indication of presence or absence of said following entry, wherein said service controller is arranged to read an indication from said first field if the result of the requested execution indicates that the instructions of the retrieved module are executed successfully and read an indication from said second field if said result indicates that the instructions of the retrieved module are not executed successfully.

4. A method of operating a switching system which comprises a switching network, a call processor for processing a call, executing instructions associated with the call and controlling the switching network to establish a connection depending on the executed instructions, a service module memory for storing a plurality of modules each containing programmed instructions for each service feature, and a plurality of service scheduling memories respectively associated with subscribers or groups of subscribers, each of the scheduling memories including a plurality of tables respectively associated with different events which may occur during the process of a call by said call processor, each of said tables comprising a plurality of entries for storing service features of different priorities, each of said entries giving an indication of presence or absence of a following entry for a service feature of lower priority to be executed next depending on a result of requested execution of instructions by said call processor, said entries of the table being arranged according to said priorities and accessible by an entry pointer, the method comprising the steps of:

a) detecting one of events when the call processor is processing a call from a subscriber;

b) retrieving a table from the service scheduling memory of the subscriber according to the detected event;

c) accessing an entry of said table according to the entry pointer and retrieving a module from said service module memory associated with the service feature of the accessed entry;

d) requesting the call processor to execute instructions of the module; and e) incrementing the entry pointer by one and repeating the steps (c) and (d) if a presence indication of a following entry is given in the entry accessed by the step (c) depending on a result of the execution requested by the step (d).

5. The method of claim 4, wherein each entry of the retrieved table includes first and second fields each containing an indication of presence or absence of said following entry, wherein the step (e) comprises the steps of:

$e_1$) reading an indication from said first field if the result of execution requested by the step (c) indicates that the instructions of the retrieved module are executed successfully;

$e_2$) incrementing the entry pointer by one and repeating the steps (c) and (d) if the indication read by the step ($e_1$) is the presence indication;

$e_3$) reading an indication from said second field if said result execution requested by the step (c) indicates that the instructions of the retrieved module are not executed successfully; and $e_4$) incrementing the entry pointer by one and repeating the steps (c) and (d) if the indication read by the step ($e_3$) is the presence indication.

* * * * *

UNITED STATES PATENT AND TRADEMARK OFFICE
CERTIFICATE OF CORRECTION

PATENT NO. : 6,212,267 B1  
DATED : April 3, 2001  
INVENTOR(S) : Mitsuhiro Hosokawa Page 1 of 1

It is certified that error appears in the above-identified patent and that said Letters Patent is hereby corrected as shown below:

Title page,
Under FOREIGN PATENT DOCUMENTS, please add the following Reference:

7-250164     9/95 (JP)

Signed and Sealed this

First Day of January, 2002

Attest:

Attesting Officer

JAMES E. ROGAN  
Director of the United States Patent and Trademark Office